(12) United States Patent
Foerster et al.

(10) Patent No.: US 11,412,065 B2
(45) Date of Patent: *Aug. 9, 2022

(54) VIDEO PLAYLISTS AND RECOMMENDATIONS BASED ON ELECTRONIC MESSAGING COMMUNICATIONS

(71) Applicant: Google LLC, Mountain View, CA (US)

(72) Inventors: Jakob Foerster, Oxford (GB); Matthew Sharifi, Kilchberg (CH)

(73) Assignee: Google LLC, Mountain View, CA (US)

( * ) Notice: Subject to any disclaimer, the term of this patent is extended or adjusted under 35 U.S.C. 154(b) by 382 days.

This patent is subject to a terminal disclaimer.

(21) Appl. No.: 16/436,840

(22) Filed: Jun. 10, 2019

(65) Prior Publication Data

US 2019/0297167 A1 Sep. 26, 2019

Related U.S. Application Data

(63) Continuation of application No. 15/391,074, filed on Dec. 27, 2016, now Pat. No. 10,320,939.

(51) Int. Cl.
| | |
|---|---|
| *H04L 67/306* | (2022.01) |
| *H04L 51/10* | (2022.01) |
| *H04L 51/52* | (2022.01) |
| *H04L 65/612* | (2022.01) |
| *H04L 65/60* | (2022.01) |
| *H04L 67/10* | (2022.01) |
| *H04N 21/25* | (2011.01) |
| *H04N 21/258* | (2011.01) |
| *H04N 21/262* | (2011.01) |
| *H04N 21/4788* | (2011.01) |
| *H04L 51/222* | (2022.01) |

(52) U.S. Cl.
CPC ............ *H04L 67/306* (2013.01); *H04L 51/10* (2013.01); *H04L 51/32* (2013.01); *H04L 65/4084* (2013.01); *H04L 65/602* (2013.01); *H04L 67/10* (2013.01); *H04N 21/251* (2013.01); *H04N 21/25891* (2013.01); *H04N 21/26258* (2013.01); *H04N 21/4788* (2013.01); *H04L 51/20* (2013.01)

(58) Field of Classification Search
CPC ..... H04L 51/10; H04L 51/32; H04L 65/4084; H04L 65/602; H04L 67/10; H04L 67/306; H04N 21/251; H04N 21/25891; H04N 21/26258; H04N 21/4788
See application file for complete search history.

(56) References Cited

U.S. PATENT DOCUMENTS

| | | | |
|---|---|---|---|
| 9,703,838 B1 * | 7/2017 | Hampson | .......... G06F 16/24578 |
| 10,320,939 B2 * | 6/2019 | Foerster | ................ H04L 65/602 |

(Continued)

*Primary Examiner* — Jeong S Park
(74) *Attorney, Agent, or Firm* — Lowenstein Sandler LLP

(57) ABSTRACT

A first user device executing a messaging application receives a first message from a second user device. The first user device that is associated with a user determines whether the first message includes a first reference to a first media item. Responsive to determining that the first message includes the first reference to the first media item, media playlist information identifying the first media item is generated. The media playlist information identifying the first media item is sent to a content sharing platform. The first media item is to be added to a media playlist maintained by the content sharing platform.

20 Claims, 5 Drawing Sheets

(56) References Cited

U.S. PATENT DOCUMENTS

| | | | | |
|---|---|---|---|---|
| 2006/0195462 A1* | 8/2006 | Rogers | .................... | H04L 67/22 |
| | | | | 707/999.005 |
| 2010/0121707 A1 | 5/2010 | Goeldi | | |
| 2011/0314388 A1* | 12/2011 | Wheatley | ............. | G11B 27/105 |
| | | | | 715/751 |
| 2013/0073979 A1* | 3/2013 | Shepherd | ............... | G06Q 50/01 |
| | | | | 715/744 |
| 2013/0218991 A1* | 8/2013 | McConnell | ........... | G06F 16/337 |
| | | | | 709/206 |
| 2014/0088952 A1* | 3/2014 | Fife | ......................... | G10L 17/22 |
| | | | | 704/9 |
| 2015/0106444 A1* | 4/2015 | Schneider | ............. | G06F 16/639 |
| | | | | 709/204 |

\* cited by examiner

VIDEO PLAYLISTS AND RECOMMENDATIONS BASED ON ELECTRONIC MESSAGING COMMUNICATIONS

RELATED APPLICATION

This application is a continuation application of U.S. patent application Ser. No. 15/391,074, filed Dec. 27, 2016, the entire contents of which is hereby incorporated by reference herein.

TECHNICAL FIELD

This disclosure relates to the field of content sharing platforms and messaging platforms and, in particular, generating playlists and recommendations based on electronic messaging communications.

BACKGROUND

Social networks connecting via the Internet allow users to connect to and share information with each other. Many social networks include a content sharing aspect that allows users to upload, view, and share content, such as video items, image items, audio items, and so on. Other users of the social network may comment on the shared content, discover new content, locate updates, share content, and otherwise interact with the provided content. The shared content may include content from professional content creators, e.g., movie clips, TV clips, and music video items, as well as content from amateur content creators, e.g., video blogging and short original video items.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method includes receiving, by a server system from a first user device executing a first instance of a messaging application, a first message for a user of a second user device executing a second instance of the messaging application. The method also includes determining whether the first message includes a first reference to a first media item. The method includes responsive to determining that the first message includes the first reference to the first media item, generating media playlist information identifying the first media item. The method also includes sending the media playlist information identifying the first media item to a content sharing platform, the first media item to be added to a media playlist maintained by the content sharing platform. In implementations, the first media item is a video item In implementations, the method includes sending the media playlist information identifying the first media item to the content sharing platform, the first media item to be recommended to the user by the content sharing platform.

In implementations, the method includes receiving, from a third user device executing a third instance of the messaging application, a second message for the user. The method also includes determining whether the second message includes a second reference to a second media item. The method includes responsive to determining that the second message includes the second reference to the second media item, updating the media playlist information to identify the second media item.

In some implementations, in determining whether the first message includes the first reference to the first media item, the method includes parsing the first message to identify a link. The method also includes identifying a uniform resource locator (URL) associated with the link. The method includes determining that the URL is associated with the content sharing platform hosting the first media item.

In some implementations, responsive to determining that the first message includes the first reference to the first media item, generating the media playlist information identifying the first media item, the method includes determining whether an indication of user interaction with the first media item has been received by the server system. The method also includes responsive to determining the indication of user interaction has not been received indicating that the first media item has not been interacted with by the user, generating the media playlist information identifying the first media item.

In implementations, responsive to determining that the first message includes the first reference to the first media item, generating the media playlist information identifying the first media item the method includes responsive to determining that the first message includes the first reference to the first media item, identifying a user preference indicating conditions for generating the media playlist information. The method includes determining whether the conditions indicated by the user preference have been satisfied. The method also includes responsive to determining the conditions indicated by the user preference have been satisfied, generating the media playlist information identifying the first media item.

In implementations, responsive to determining that the first message includes the first reference to the first media item, generating the media playlist information identifying the first media item the method includes analyzing a conversation comprising the first message using a machine-learning language classifier. The method includes determining a sentiment of the conversation based on the machine-learning language classifier. The method includes responsive to determining the conversation is associated with a positive user sentiment, generating the media playlist information identifying the positive user sentiment. The method includes responsive to determining the conversation is associated with a negative user sentiment, refraining from generating the media playlist information for the first media item.

In implementations, responsive to determining that the first message includes the first reference to the first media item, generating the media playlist information identifying the first media item the method includes analyzing a conversation comprising the first message using a machine-learning language classifier. The method includes determining a topic of the conversation based on the machine-learning language classifier. The method includes generating the media playlist information identifying the topic of the conversation.

In implementations, responsive to determining that the first message includes the first reference to the first media item, generating the media playlist information identifying the first media item the method includes determining a sending user associated with a conversation comprising the first message. The method includes generating the media playlist information identifying the sending user.

In implementations, the method includes determining an association between a first user account associated with the user of the second user device executing the second instance of the messaging application and a second user account for the user for the content sharing platform. The method includes generating media playlist information identifying the second user account.

In implementations, a method includes receiving, by a content sharing platform, media playlist information from a messaging platform. The media playlist information identifies a media item and a user of the content sharing platform, and indicates that the media item was referenced in a message sent to the user via the messaging platform. The method includes determining, by a processing device of the content sharing platform, whether a user account of the user is associated with a media playlist designated for messaging communications of the user. The method includes responsive to determining that the user account is associated with the media playlist designated for messaging communications of the user, adding the media item to the media playlist designated for messaging communications of the user. The method includes responsive to determining that the user account is not associated with the media playlist designated for messaging communications of the user, creating the media playlist designated for messaging communications of the user and adding the media item to the created media playlist. In implementations, the method includes sending the media item to a user device for playback in a media viewer.

In implementations, wherein responsive to determining that the user account is associated with the media playlist designated for messaging communication of the user, adding the media item to the media playlist the method includes comparing a size of the media playlist to a threshold size. The method includes responsive to determining the size of the media playlist is below the threshold size, adding the media item to the media playlist designated for messaging communications of the user. The method includes responsive to determining the size of the media playlist is above the threshold size, creating the media playlist designated for messaging communications of the user and adding the media item to the created playlist.

In additional implementations, one or more processing devices for performing the operations of the above described implementations are disclosed. Additionally, in implementations of the disclosure, a non-transitory computer-readable storage medium stores instructions for performing the operations of the described implementations. Also in other implementations, systems for performing the operations of the described implementations are also disclosed.

DESCRIPTION OF DRAWINGS

Various implementations of the present disclosure will be understood more fully from the detailed description given below and from the accompanying drawings of various implementations of the disclosure.

DETAILED DESCRIPTION

Figure 1:
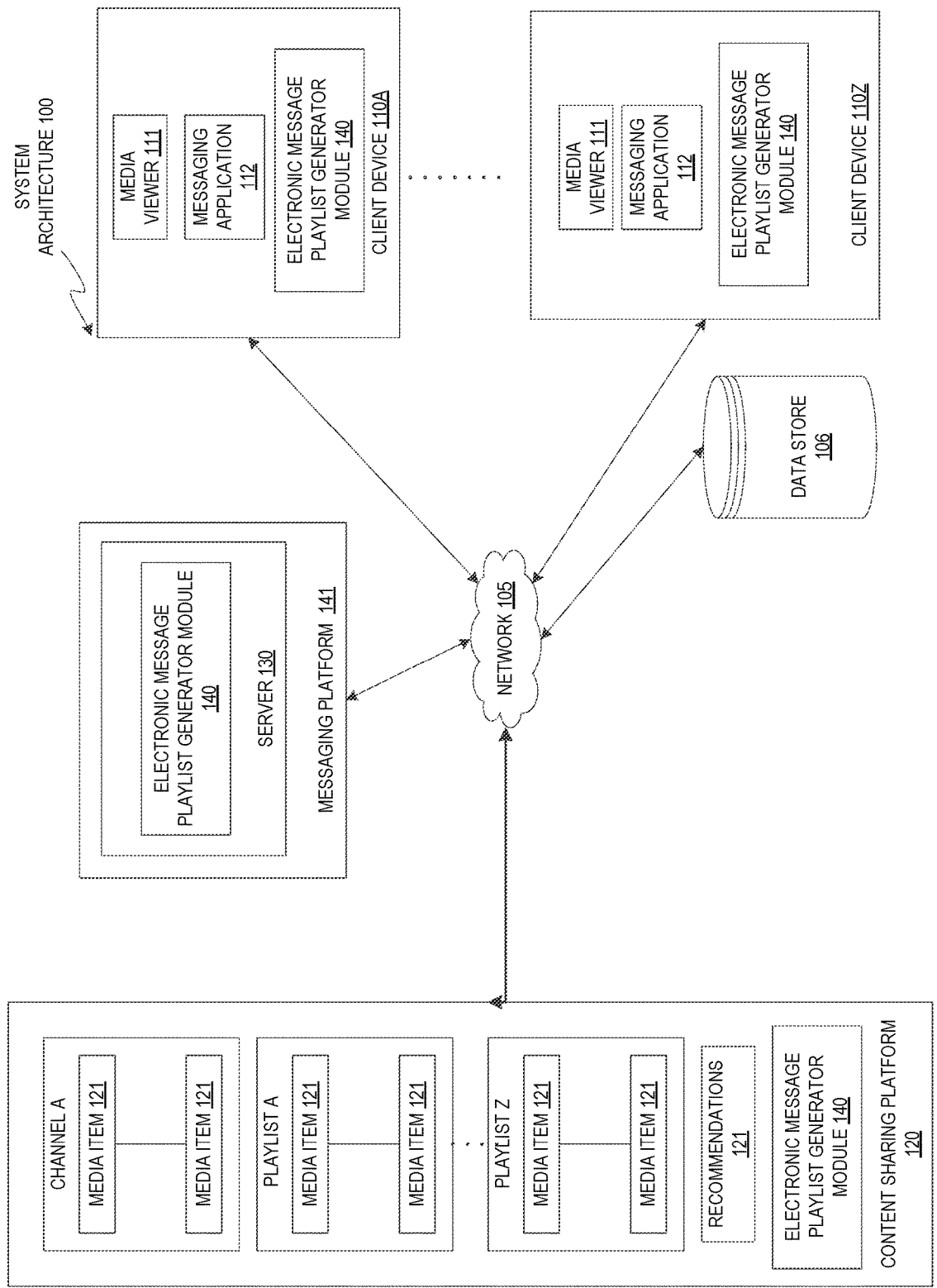
FIG. 1 illustrates an example system architecture, in accordance with one implementation of the disclosure

Messaging platforms have been adopted by users to communicate with other users using electronic devices. For example, electronic messages, such as instant messages, are exchanged in a conversation between participants (e.g., users). In another example, a content sharing platform may send, to its users, notifications including recommendations of media items via electronic messages such as instant messages. The electronic messages may contain a reference (e.g., link, thumbnail, etc.) to a media item, such as a video item. Often a user receiving an electronic message referencing a media item may not be able to consume (watch or listen to) the referenced media item right away and may want to access it a later time. However, electronic messages may be periodically deleted by the messaging platform, and may be organized in a way that makes accessing the media items referenced in electronic messages difficult or untenable. As a result, many media items referenced in electronic messages may be missed or forgotten by message recipients.

Aspects of the present disclosure address the above-mentioned and other deficiencies by creating media item playlists and recommendations based on messaging communications. In particular, aspects of the present disclosure identify an electronic message sent to a user, and determine whether the electronic message includes a reference to a media item. Responsive to determining that the message includes a reference to the media item, aspects of the present disclosure may generate media playlist information identifying the media item. The media playlist information identifying the media item may be sent to a content sharing platform where the media item is added to a media playlist maintained by the content sharing platform for the user.

By automatically creating playlists and recommendations based on messaging communications, the technology disclosed herein is advantageous because it provides a convenient playlist creation tool, which improves an overall user experience with the content sharing platform, and increases the number of videos and other media items consumed by users of the content sharing platform. In addition, aspects of the present disclosure result in significant reduction of storage resources and significant reduction of computational (processing) resources because generating playlist information used to create a playlist including media content for a user is more efficient than storing electronic messages, and providing searching capabilities to find references to media items in the stored electronic messages.

For purposes of clarity and simplicity, the term "electronic message" or "message" may refer to a data message sent and received over a communications network. An electronic message may include an instant message, a text message (e.g., short message service (SMS), multimedia message (MMS), iMessage®), electronic mail (email), voice message, or video message, among others.

For purposes of clarity and simplicity, the term "conversation" may be a grouping of one or more electronic messages by one or more criteria. For example, a conversation (such as an instant message conversation or text conversation) may group one or more electronic messages by the participants involved in the conversation. Participants may refer to the one or more users involved or associated with a particular conversation.

For purposes of clarity and simplicity, the term "playlist" or "media playlist" may be a list or an order or a grouping of different media items that can be viewed or displayed or played back in sequential or shuffled order with or without interaction from a user.

FIG. 1 illustrates an example system architecture 100, in accordance with one implementation of the disclosure. The system architecture 100 includes client devices 110A through 110Z, a network 105, a data store 106, a content sharing platform 120, and a server 130.

In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). In one implementation, data store 106 stores media items, such as video items.

The client devices 110A through 110Z may each include computing devices such as personal computers (PCs), laptops, mobile phones, smart phones, tablet computers, netbook computers, network-connected televisions, etc. In some implementations, client devices 110A through 110Z may also be referred to as "user devices." Each client device includes a media viewer 111. In one implementation, the media viewers 111 may be applications that allow users to view or upload content, such as images, video items, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also include an embedded media player (e.g., a Flash® player or an HTML5 player) that is embedded in a web page (e.g., a web page that may provide information about a product sold by an online merchant). In another example, the media viewer 111 may be a standalone application (e.g., a mobile application or app) that allows users to view digital media items (e.g., digital video items, digital images, electronic books, etc.). According to aspects of the disclosure, the media viewer 111 may be a content sharing platform application for users to record, edit, and/or upload content for sharing on the content sharing platform. As such, the media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130.

In general, functions described in one implementation as being performed by the content sharing platform 120 can also be performed on the client devices 110A through 110Z in other implementations, if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), disapprove of ("dislike"), and/or comment on media items. The content sharing platform 120 may also include a website (e.g., a webpage) or application back-end software that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

The content sharing platform 120 may include multiple channels (e.g., channels A through Z). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content sharing platform, feed items produced by that channel may be shown on the channel home page. Users may have a syndicated feed, which is a feed including at least a subset of the content items from all of the channels to which the user is subscribed. Syndicated feeds may also include content items from channels that the user is not subscribed. For example, the content sharing platform 120 or other social networks may insert recommended content items into the user's syndicated feed, or may insert content items associated with a related connection of the user in the syndicated feed.

Each channel may include one or more media items 121. Examples of a media item 121 can include, and are not limited to, digital video, digital movies, digital photos, digital music, audio content, melodies, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as content or a content item.

A media item 121 may be consumed via the Internet and/or via a mobile device application. For brevity and simplicity, a video item is used as an example of a media item 121 throughout this document. As used herein, "media," "media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 106. In another implementation, the content sharing platform 120 may store video items and/or fingerprints as electronic files in one or more formats using data store 106.

In one implementation, the media items are video items. A video item is a set of sequential video frames (e.g., image frames) representing a scene in motion. For example, a series of sequential video frames may be captured continuously or later reconstructed to produce animation. Video items may be presented in various formats including, but not limited to, analog, digital, two-dimensional and three-dimensional video. Further, video items may include movies, video clips or any set of animated images to be displayed in sequence. In addition, a video item may be stored as a video file that includes a video component and an audio component. The video component may refer to video data in a video coding format or image coding format (e.g., H.264 (MPEG-4 AVC), H.264 MPEG-4 Part 2, Graphic Interchange Format (GIF), WebP, etc.). The audio component may refer to audio data in an audio coding format (e.g., advanced audio coding (AAC), MP3, etc.). It may be noted GIF may be saved as an image file (e.g., .gif file) or saved as a series of images into an animated GIF (e.g., GIF89a format). It may be noted that H.264 may be a video coding format that is block-oriented motion-compensation-based video compression standard for recording, compression, or distribution of video content, for example.

In implementations, content sharing platform 120 may allow users to create, share, view or use playlists containing media items (e.g., playlist A-Z, containing media items 121). A playlist refers to a collection of media items that are configured to play one after another in a particular order without any user interaction. In implementations, content sharing platform 120 may maintain the playlist on behalf of a user. In implementations, the playlist feature of the content sharing platform 120 allows users to group their favorite media items together in a single location for playback. In implementations, content sharing platform 120 may send a media item on a playlist to client device 110 for playback or display. For example, the media viewer 111 may be used to play the media items on a playlist in the order in which the media items are listed on the playlist. In another example, a user may transition between media items on a playlist. In still another example, a user may wait for the next media item on the playlist to play or may select a particular media item in the playlist for playback.

In implementations, a playlist may be associated with a particular user or users, or made widely available to users of the content sharing platform 120. In implementations, where content sharing platform 120 associates one or more playlists with a specific user or group of users, content sharing platform 120 may associated the specific user with a playlist using user account information (e.g., a user account identifier such as username and password). In other implementations, content sharing platform 120 may associate a playlist with additional information (also referred to as "metadata" or "playlist metadata" herein). For example, a playlist may be associated with a title (e.g., Jakob's playlist), information related to the playlist (e.g., when the playlist was created, user account information), additional information regarding the media items of the playlist (e.g., artist information, genre, tempo, a hyperlink (link) to the media item, etc.), or information regarding the electronic messages used to populate the playlist with the media items (e.g., part or all the electronic messages, sentiment identifiers associated with the electronic messages, topics associated with the electronic messages, sender or receiver information related to the electronic messages (such as name of sender), etc.).

In some implementations, a playlist may be created by content sharing platform 120 (or messaging platform 141) for the user. The media items of the playlist created by the content sharing platform 120 may include media items identified in electronic messages, such as instant messages, by messaging platform 141. Playlist creation and generation based on electronic messages may be further described below at least with respect to FIG. 2.

In some implementations, content sharing platform 120 may make recommendations of media items to a user or group of users. A recommendation may be an indicator (e.g., interface component, electronic message, recommendation feed, etc.) that provides a user with personalized suggestions of media items that may appeal to a user. In implementations, a recommendation may be made using data from a variety of sources including a user's favorite media items, recently added playlist media items, recently watched media items, media item ratings, information from a cookie, user history, and other sources. In one implementation, a recommendation may be based on media items referenced in electronic messages. Recommendations based on media items reference in electronic message may be further described below at least with respect to FIG. 2.

Messaging platform 141 may be a system that allows users to exchange electronic messages via a communication system, such as network 105. Messaging platform 141 may be associated with one or more messaging applications 112 that allow users to interface with messaging platform 141 and exchange electronic messages among users. Messaging platform 141 may be, for example, an instant messaging platform, a text messaging platform, an email platform, a voice messaging platform, a video messaging platform, or a combination of multiple platforms, among others. It may be noted that in one implementation, messaging applications 112 may be instances of the same messaging application. In other implementations, messaging application 112 associated with client device 110A and messaging application 112 associated with client device 110Z may be different messaging applications associated with different messaging platforms.

In implementations, the server 130 may be one or more computing devices (e.g., a rackmount server, a server computer, etc.). The server 130 may be included in the content sharing platform 120, be an independent system or be part of another system/platform, such as messaging platform 141. The server 130 may include an electronic message playlist generator module 140.

In implementations, content sharing platform 120 and messaging platform 141 (and client device 110) may exchange information, such as playlists information, using an application program interface (API). In other implementations, content sharing platform 120 and messaging platform 141 (and client device 110) may link a user account of the content sharing platform 120 to a user account of the messaging platform 141. For example, messaging platform 141 may associate user account information (e.g., user name and password) of the content sharing platform 120 and user account information of messaging platform 141 with a common user (using a table, etc.). Messaging platform 141 may use the user account information to send playlist information to content sharing platform 120 or generate a playlist using content sharing platform 120 on behalf of the user. In another example, a user account of the content sharing platform 120 and a user account of the messaging platform 141 may be linked using single sign-on (SSO).

In implementations, messaging platform 141 may facilitate the exchange of electronic messages between users. For example, a user may be logged into messaging application 112 on client device 110A, and another user may be logged into messaging application 112 on client device 110Z. The two users may start a conversation, such as an instant messaging conversation. Messaging platform 141 may help facilitate the messaging conversation by sending and receiving the electronic messages between the users. Messaging platform 141 may determine if the electronic message received by a user (e.g., user associated with messaging application 112 on client device 110A) contains a reference (e.g., a hyperlink (link) or thumbnail) to a media item, such as a video item. Responsive to determining the electronic message contains a reference to the media item, messaging platform 141 may generate playlist information that contains the reference to the video item. As the conversation between the two users continues, messaging platform 141 may identify additional references to other media items, and continue to populate the playlist information with additional references to the other media items. In some implementations, all or some of the references in the playlist information point to media items hosted by a single platform, such as content sharing platform 120. The playlist information may be sent to the content sharing platform 120 for generation of a playlist. The content sharing platform 120 may generate the playlist and associate the playlist with the appropriate user account. A user of the appropriate user account may access the playlist from the content sharing platform 120 using a user device, such as client device 110A.

In implementations, playlist information (also referred to as "list information" herein) may be the information used to generate a playlist for a user of content sharing platform 120. In implementations, the playlist information may include identifiers (e.g., references to, such as links or names) of one or more media items. The playlist information may also include additional data (also referred to as "metadata" or "playlist information metadata" herein), such as a playlist identifier (e.g., title information), a user account identifier (e.g., for the content sharing platform 120, the messaging platform 141, or both), or information regarding the electronic message (or conversation) that included the reference to a media item (e.g., part or all the electronic messages, sentiment identifiers associated with the electronic messages, topic identifiers associated with the electronic messages, sender or receiver identifiers identifying the sender or receiver of the electronic messages, etc.).

For purposes of clarity and simplicity, the term "instant message" (IM) is used herein to refer to an electronic message between two or more participants, although the present disclosure applies to various other types messaging communications. An instant message may include text, electronic files (including, video items, image items, audio items), hyperlinks (also referred to as "link" herein), face-to-face chat, streaming content (e.g., live-stream), among others. A live-stream may be a live broadcast or transmission of a live event, where the media item (e.g., video item) is concurrently transmitted as the event occurs. In implementations, the two or more participants use instances of the same instant messaging application to send and receive instant messages between participants. In implementations, instant messages may facilitate real-time communication (within the practical and technological constrains) or perceived real-time communication between participants.

For purposes of clarity and simplicity, the term "instant messaging platform" may be a messaging platform that provides an instant messaging service to multiple client devices. In some implementations, each client device may implement an instance of an instant messaging application provided by the instant messaging platform. The instant messaging application may provide an interface for users to send and receive instant messages to others using an instance of the messaging platform. In implementations, the instant messaging platform implements a centralized server for sending and receiving instant messages. The instant messaging platform may implement end-to-end encryption on instant messages. In still other implementations, the instant messaging platform may implement push technology. In implementations, users of an instant messaging application may know the status of recipients (e.g., offline or online), and know if an instant message is received by another user. In some applications, an instant messaging application may use a username or password for login. Participants may be logged in to the same central server. In implementations, an instant message may be sent only to participants that are online and logged in.

For the sake of illustration, electronic message playlist generator module 140 is implemented on server 130 of messaging platform 141. In other implementations, electronic message playlist generator module 140 may in part or wholly be implemented on client device 110. In other implementations, electronic message playlist generator module 140 may in part or wholly be implemented on content sharing platform 120. In other implementations, electronic message playlist generator module 140 operating on one or more of messaging platform 141, client device 110, or content sharing platform 120 may work in conjunction to perform the operations described herein.

Although implementations of the disclosure are discussed in terms of content sharing platforms and promoting social network sharing of a content item on the content sharing platform and messaging platforms, implementations may also be generally applied to any type of social network providing connections between users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
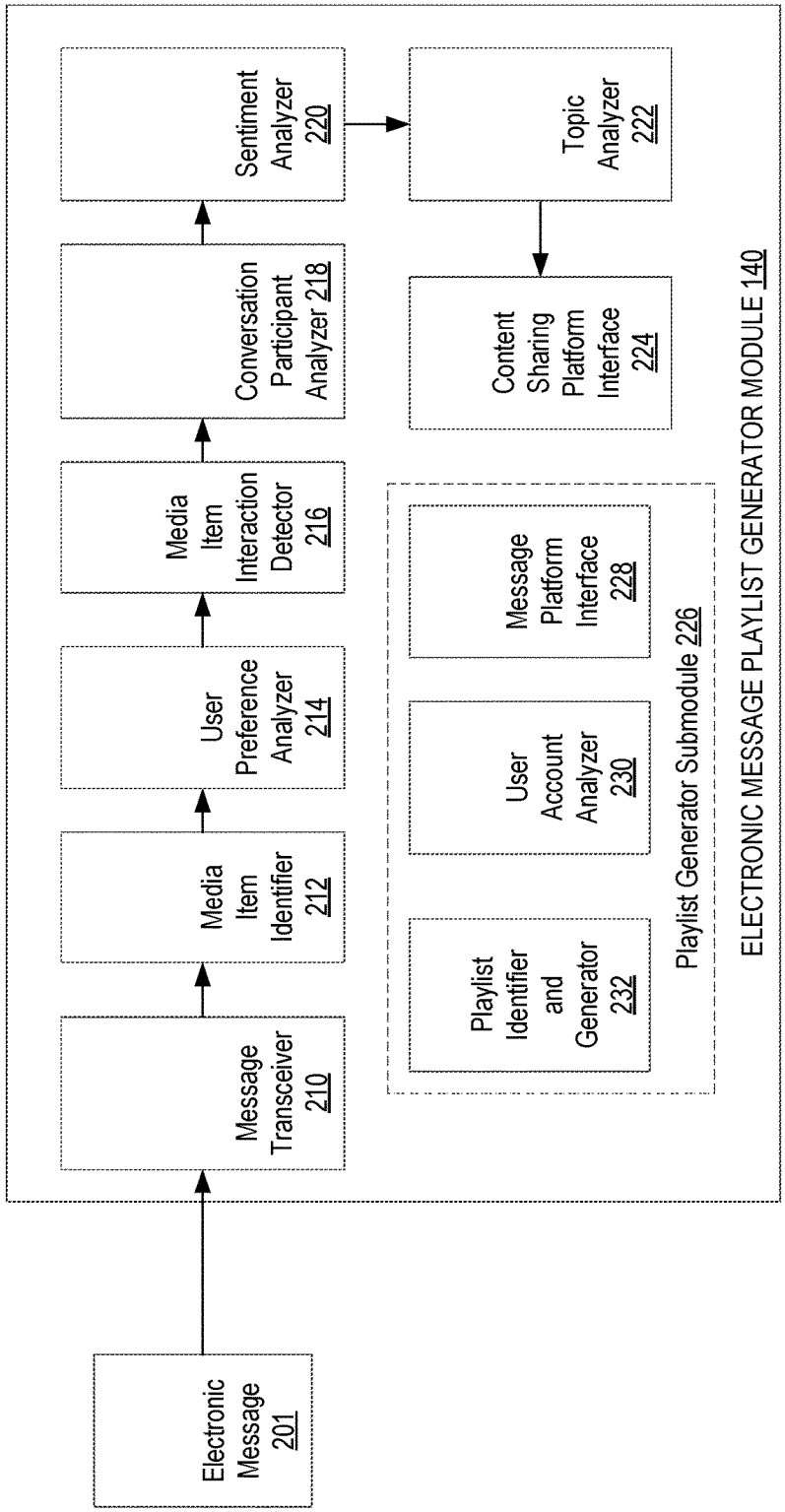
FIG. 2 is an example use of an electronic message playlist generator module, in accordance with an implementation of the disclosure.

FIG. 2 is an example use of an electronic message playlist generator module, in accordance with an implementation of the disclosure. System 200 may include similar features to system architecture 100 as described with respect to FIG. 1. It may be noted that features of FIG. 1 may be used herein to help describe FIG. 2. Electronic message playlist generator module 140 includes message transceiver 210, media item identifier 212, user preference analyzer 214, media item interaction detector 216, conversation participant analyzer 218, sentiment analyzer 220, topic analyzer 222, content sharing platform interface 224, message platform interface 228, user account analyzer 230, and playlist identifier and generator 232. It may be noted that in implementations electronic message playlist generator module 140 may include the same, fewer, more, or different components. It may also be noted that the arrows between the components are provided for purposes of illustration, rather than limitation. Components may interact with other components serially, in parallel, a combination thereof, or in any other manner. For purposes of illustration, rather than limitation, a video item may be described as an example of a media item. For purposes of illustration, rather than limitation, playlists and playlist information are generated based electronic messages received by a user. It may be noted that in other implementations playlists and playlist information may be generated based on electronic messages sent and/or received by a user.

In implementations, electronic messages 201 may be intercepted, sent and received, or accessed from data store 106 by electronic message playlist generator module 140. Message transceiver 210 of electronic message playlist generator module 140 may receive electronic messages 201. The electronic messages 201 may be part of a conversation between participants or a message notifying a user about a video, audio, etc.

In an implementation, media item identifier 212 may receive electronic message 201, and scan or parse the electronic message 201 for a reference to a media item. In implementations, the reference to the media item may be a link, a thumbnail, or any identifier that references a media item or web resource including the media item. In one implementation, media item identifier 212 may identify a uniform resource locator (URL) within or associated with the link or thumbnail. Media item identifier 212 may compare the URL with a record of known (e.g., known to host or contain media items) or trusted links to determine that the first message includes a reference to a media item. In other implementations, media item identifier 212 may perform a lookup of the URL in an index (e.g., Web index populated by a Web crawler). The index may contain information about the contents of websites and the individual webpages of a website. Media item identifier 212 may use the lookup of the URL to confirm that a particular webpage or website contains the media item and determine the message includes a reference to the media item. In one implementation, responsive to determining that electronic message 201 includes a reference to a media item, electronic message playlist generator module 140 may generate media playlist information identifying the media item (e.g., media item identifier).

In implementations, electronic message playlist generator module 140 may check with user preference analyzer 214 to determine user preferences in regards to generating playlist information or generating playlists. A user may have options to configure user preferences for the generation of playlists or playlist information using messaging application 112 of messaging platform 141, for example. For example, the user may specify user preference options to generate playlists or not generate playlists. In other examples, the user preference options may include a greater granularity of options for user control. For example, the user may indicate that playlists are to be generated for media items for a particular conversation, for a particular user or user account, for a particular URL, for media items associated with a particular sentiment (e.g., positive sentiment), for media items associated with a particular topic, among others. In implementations, user preference analyzer 214 may identify the user preferences that indicate conditions (e.g., selected user preference options) for generating media playlist information. Responsive to determining the conditions indicated by the user preferences have been satisfied, electronic message playlist generator module 140 may generate the media playlist information identifying the media item.

In implementations, media item interaction detector 216 may monitor user interaction with the electronic message 201 to determine whether a user has interacted with the reference to the media item (or has consumed the media item). In one implementation, media item interaction detector 216 may receive an indicator that the user has interacted with the reference to the media item in the electronic message 201. For example, media item interaction detector 216 may receive an indicator from messaging application 112 executed on client device 110 that the user has clicked a link or thumbnail for the media item contained in electronic message 201. In implementations, responsive to the user not interacting with the reference to the media item, electronic message playlist generator module 140 may generate playlist information identifying the media item. In some implementations, responsive to the user not interacting with the reference to the media item within a threshold amount of time (e.g., 5 minutes), electronic message playlist generator module 140 may generate playlist information identifying the media item.

In implementations, conversation participant analyzer 218 may determine the participants involved in a particular conversation. For example, conversation participant analyzer 218 may identify the user account information associated with a particular conversation. From the user account information, conversation participant analyzer 218 may identify a user name, address, or another identifier of the participants in the conversation. In some implementations, conversation participant analyzer 218 may determine the sending user of particular message of a conversation, or determine the recipient user of a particular message of conversation. In some implementations, the participant identifiers (e.g., sending user identifier, etc.) may be added to the playlist information metadata of the media playlist information. In implementations, the participant identifiers may be used to determine whether one or more conditions indicated by the user preferences have been satisfied. For example, a user may specify to only generate playlists from conversations including participant X. It may be noted that different playlists (and associated different media playlist information) may be based on the participant identifier. For example, a playlist (and associated media playlist information) may include a participant identifier for a particular user. Media items included in the playlist (and associated media playlist information) may be from conversations (or parts of conversations) having the same user (e.g., same participant identifier for a particular user). The playlist information metadata including the participant identifiers may be used by content sharing platform 120 to create different playlists or add media items to the appropriate playlist, as further described with respect to playlist generator submodule 226 of FIG. 2.

In some implementations, electronic message playlist generator module 140 may include sentiment analyzer 220. Sentiment analyzer 220 may determine a sentiment of electronic message 201 or of a conversation that includes electronic message 201. A sentiment may be a view or attitude or feeling of an electronic message or of all or part of a conversation. In implementations, sentiment analyzer 220 may determine that the sentiment of a conversation that includes electronic message 201 may have positive user sentiment or negative user sentiment. Responsive to determining a positive user sentiment, electronic message playlist generator module 140 may include a sentiment identifier (e.g., positive user sentiment identifier) in the playlist information metadata. In other implementations, sentiment analyzer 220 may determine different categories (e.g., labels) of positive user sentiment. For example, positive user sentiment may be further categorized into types of positive user sentiment such an interesting sentiment, interactive sentiment, funny sentiment, and so forth.

In implementations, the sentiment identifiers may be used to determine whether one or more conditions indicated by the user preferences have been satisfied. For example, a user may specify messaging platform 141 to generate playlists from conversations with positive user sentiment. In some implementations, the sentiment identifiers (e.g., positive user sentiment identifier, etc.) may be added to the playlist information metadata of the media playlist information. It may be noted that different playlists (and associated different media playlist information) may be based on the sentiment identifier. For example, a playlist (and associated media playlist information) may include a positive user sentiment identifier. Media items included in the playlist (and associated media playlist information) may be from conversations (or parts of conversations) having the same positive user sentiment as determined, for example, from the subject of the message, keywords and approval/disapproval indicators in the body of the message, context of the message, certain patterns occurring as a response (e.g., "wow," "lol," etc.), the type of the response indicating whether the user found the media item funny, interesting, etc. The playlist information metadata including the sentiment identifiers may be used by content sharing platform 120 to create different playlists or add media items to the appropriate playlist, as further described with respect to playlist generator submodule 226 of FIG. 2.

In implementations, a machine-learning language classifier model may be used to determine the sentiment of electronic message 201 or of all or part of a conversation containing electronic message 201. A machine-learning language classifier may include a neural network classifier, support vector machine classifier, or other machine learning model. In implementations, the machine-learning language classifier may use binary classification (e.g., positive user sentiment class or negative user sentiment class). In other implementations, the machine-learning language classifier may use multiclass classification (e.g., positive user sentiment class that includes interesting sentiment label, interactive sentiment label, funny sentiment label, etc.). In implementations, the machine-learning language classifier model may be trained using actual electronic messages. The training electronic messages may be divided into different classes or labels for purposes of training the machine-learning language classifier model.

In some implementations, electronic message playlist generator module 140 may include topic analyzer 222. Topic analyzer 222 may determine a topic of electronic message 201 or a conversation that includes electronic message 201. A topic may be a matter (or prevailing matter) dealt with in an electronic message or in all or part of a conversation. In implementations, topic analyzer 222 may determine the topic of a conversation is weddings, sports, hobbies, automobiles, etc. as determined, for example, from the subject of the message, keywords in the body of the message, context of the message, etc. Responsive to determining a topic of conversation, electronic message playlist generator module 140 may include a topic identifier that identifiers the topic the conversation in the playlist information metadata. It may be noted that different playlists (and associated different media playlist information) may be based on topics of a conversation. For example, a playlist (and associated media playlist information) may include a wedding topic identifier. Media items included in the playlist (and associated media playlist information) may be from conversations (or parts of conversations) about a wedding topic, for example. In implementations, the topic identifiers may be used to determine whether one or more conditions indicated by the user preferences have been satisfied. For example, a user may specify on messaging platform 141 to generate playlists from conversations involving the topic of weddings. The playlist information metadata including the topic identifiers may be used by content sharing platform 120 to create different playlists or add media items to the appropriate playlist, as further described with respect to playlist generator submodule 226 of FIG. 2.

In implementations, a machine-learning language classifier model may be used to determine the topic of electronic message 201 or of all or part of a conversation containing electronic message 201. The machine-learning language classifier model may be similar as described with respect to sentiment analyzer 220 described above.

In some implementations, content sharing platform interface 224 may be part of electronic message playlist generator module 140. Content sharing platform interface 224 may facilitate the communication between messaging platform 141 and content sharing platform 120, as described above with respect to FIG. 1. In some implementations, content sharing platform interface 224 may send media playlist information to content sharing platform 120 using an API.

In implementations, playlist generator submodule 226 may be implemented by content sharing platform 120 to facilitate the generation of playlists by content sharing platform 120. In other implementations, messaging platform 141 may implement playlist generator submodule 226 to generate the playlist on content sharing platform 120, and content sharing platform 120 maintains the playlists for consumption by users.

In implementations, message platform interface 228 may receive media playlist information from content sharing platform interface 224. The media playlist information may identify one or more media items, as well as metadata such a message platform identifier, user account identifier, participant identifier, sentiment identifier, topic identifier, type of media item (e.g., music, film trailer, etc.), as well as electronic message 201 or all or part of the conversation containing electronic message 201. Message platform interface 228 may receive the media playlist information and use the message platform identifier of the media playlist information to determine whether the media playlist information is from a trusted message platform.

In implementations, the user account analyzer 230 may use the media playlist information to identify a particular user account where the media item, identified in the media playlist information, is to be added. A user account identifier may be used to determine the appropriate user account. The user account identifier may identify a particular user account, the user, or any other information that may be used to identify or access the particular user account associated with the content sharing platform 120.

In implementations, responsive to identifying the appropriate user account, media playlist information may be sent to playlist identifier and generator 232. Playlist identifier and generator 232 may use the media playlist information to determine which playlist associated with the user account should receive the additional media items. The media playlist information may identify the appropriate playlist using one or more identifiers included in the media playlist information (e.g., title identifier, sentiment identifier, participant identifier, etc.). In implementations, responsive to finding the appropriate playlist associated with the user account, playlist identifier and generator 232 may add the media item to the playlist. In implementations, responsive to determining that the user account is not associated with the particular playlist, playlist identifier and generator 232 may create a playlist, and add the media item to the created playlist. In some implementations, playlist identifier and generator 232 may label the playlist using, for example, the topic of the message, metadata from the added media items (e.g., all videos are music or all video are film trailers, etc.).

In some implementations, after locating the appropriate playlist on the user account, playlist identifier and generator 232 may compare a size of the playlist to a threshold size. Size may be measured in various ways, such as number of media items in the playlist, total length of playback time for the media items in the playlist, total data size for the media items in the playlist, etc. Responsive to determining the size of the media playlist is below the threshold size, playlist identifier and generator 232 may add the media item to the playlist designated for messaging communications of the user. Responsive to determining the size of the playlist is equal to or above the threshold size, playlist identifier and generator 232 may create the media playlist and add the media item to the created playlist.

As noted above, the media playlist information may identify the appropriate playlist using identifiers. In some implementations, the media playlist information may identify a title of the playlist where the media items are to be added (e.g., title identifier). It may be noted that in some implementations, the identifiers described herein may be used as the title identifier. In some implementations, media playlist information may identify one or more participants in a conversation using a participant identifier. Different playlists may be created for different participant identifiers. For example, a playlist may be generated for a conversation that includes participant X, and another playlist may be generated for a conversation that includes participant Y. In other implementations, the participant identifiers may be associated with the playlist as playlist metadata. In implementations, the participants identified by a participant identifier may be used to determine the title of the playlist (e.g., videos share by Matthew).

In some implementations, media playlist information may identify a sentiment of the conversation that contained the media item using a sentiment identifier. Different playlist may be created for different sentiment identifiers. For example, a playlist may be generated for a funny sentiment identifier, and another playlist may be generated for an interesting sentiment identifier. In other implementations, the sentiment identifiers may be associated with the playlist as playlist metadata. In implementations, the sentiment identified by a sentiment identifier may be used to determine the title of the playlist (e.g., funny videos).

In some implementations, media playlist information may identify a topic of the conversation that contained the media item using a topic identifier. Different playlist may be created for different topic identifiers. For example, a playlist may be generated for a wedding topic identifier, and another playlist may be generated for an automobile topic identifier. In other implementations, the topics identifiers may be associated with playlists as playlist metadata. In implementations, the topic identified by a topic identifier may be used to determine the title of the playlist (e.g., wedding videos). It may be noted that multiple identifier may be used in to determine the title of the playlist. (e.g., funny wedding videos sent by Jakob).

In some implementations, playlist identifier and generator 232 may use the media items identified in the media playlist information to generate recommendations for the user of the user account. For example, playlist identifier and generator 232 may present the user with one or more thumbnails for the media items identified in the media playlist information.

It may also be noted that in some implementations, the playlist may be media items other than video items, such audio items, articles, shopping websites. In some implementations, the playlist (or list) may be presented on a user interface (e.g., webpage or application page) that provides some description about the particular media item, and directs the user (e.g. click-through) to the media item hosted by a platform other than content sharing platform 120.

Figure 3:
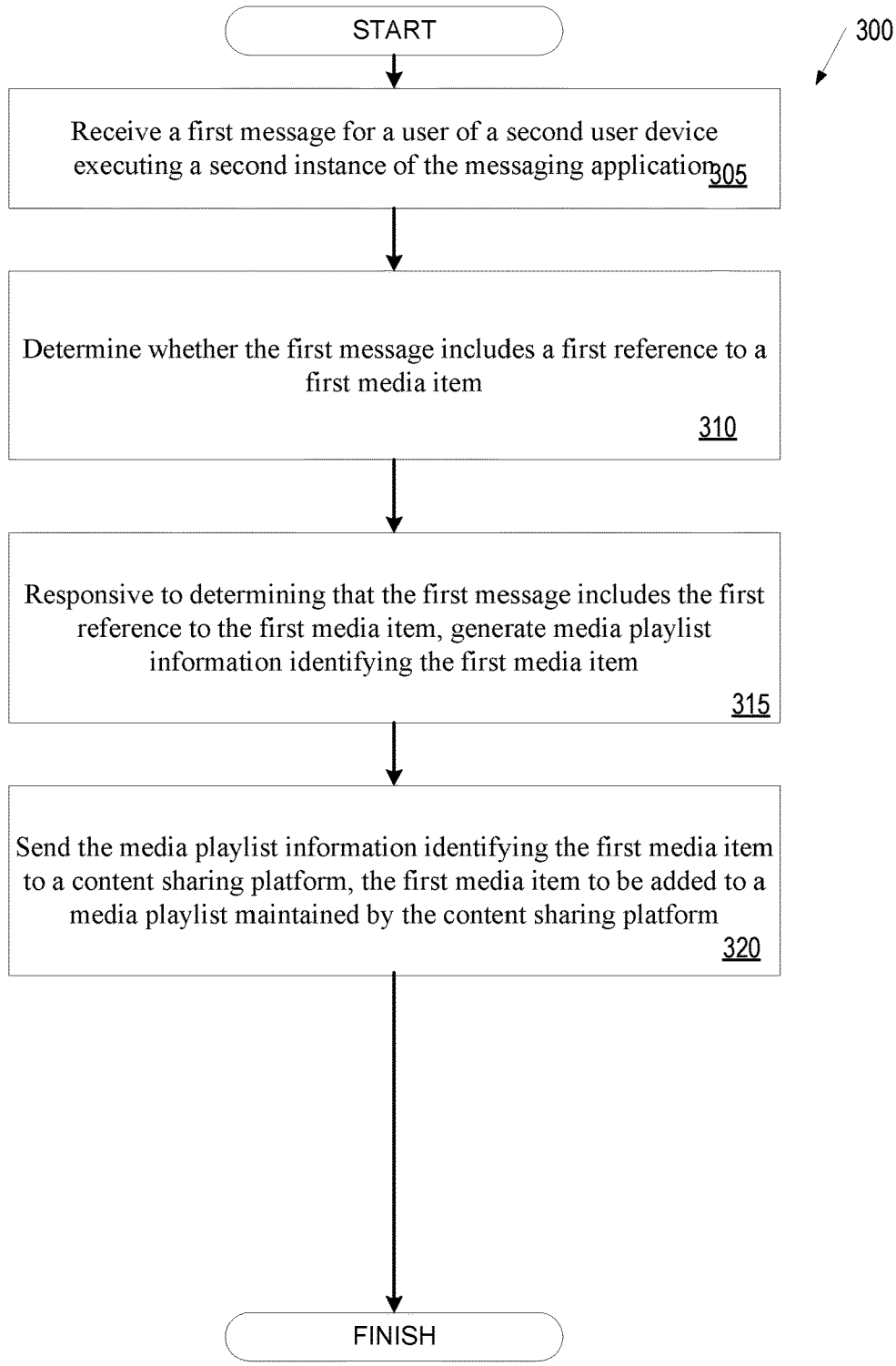
FIG. 3 is a flow diagram illustrating method 300 for generating media playlist information for generation of a media playlist, in accordance with some implementations.

FIG. 3 is a flow diagram illustrating method 300 for generating media playlist information for generation of a media playlist, in accordance with some implementations. Method 300 may be performed by processing logic that includes hardware (e.g., circuitry, dedicated logic, programmable logic, microcode), software (e.g., instructions run on a processing device to perform hardware simulation), or a combination thereof. In one implementation, electronic message playlist generator module 140 may perform some or all the operations described herein. In some implementations, electronic message playlist generator module 140 executing at the messaging platform 141, client device 110, or combination thereof may perform some or all the operations.

Method 300 begins at block 305 where processing logic receives, by a server system from a first user device executing a first instance of a messaging application, a first message for a user of a second user device executing a second instance of the messaging application. At block 310, processing logic determines whether the first message includes a first reference to a first media item. Responsive to determining that the first message does not include a first reference to a first media item, processing logic may continue to monitor electronic messages. At block 315, processing logic responsive to determining that the first message includes the first reference to the first media item, generates media playlist information identifying the first media item. At block 320, processing logic sends the media playlist information identifying the first media item to a content sharing platform. The first media item is added to a media playlist maintained by the content sharing platform. Alternatively or in addition, the first media item is recommended to the user by the content sharing platform.

Figure 4:
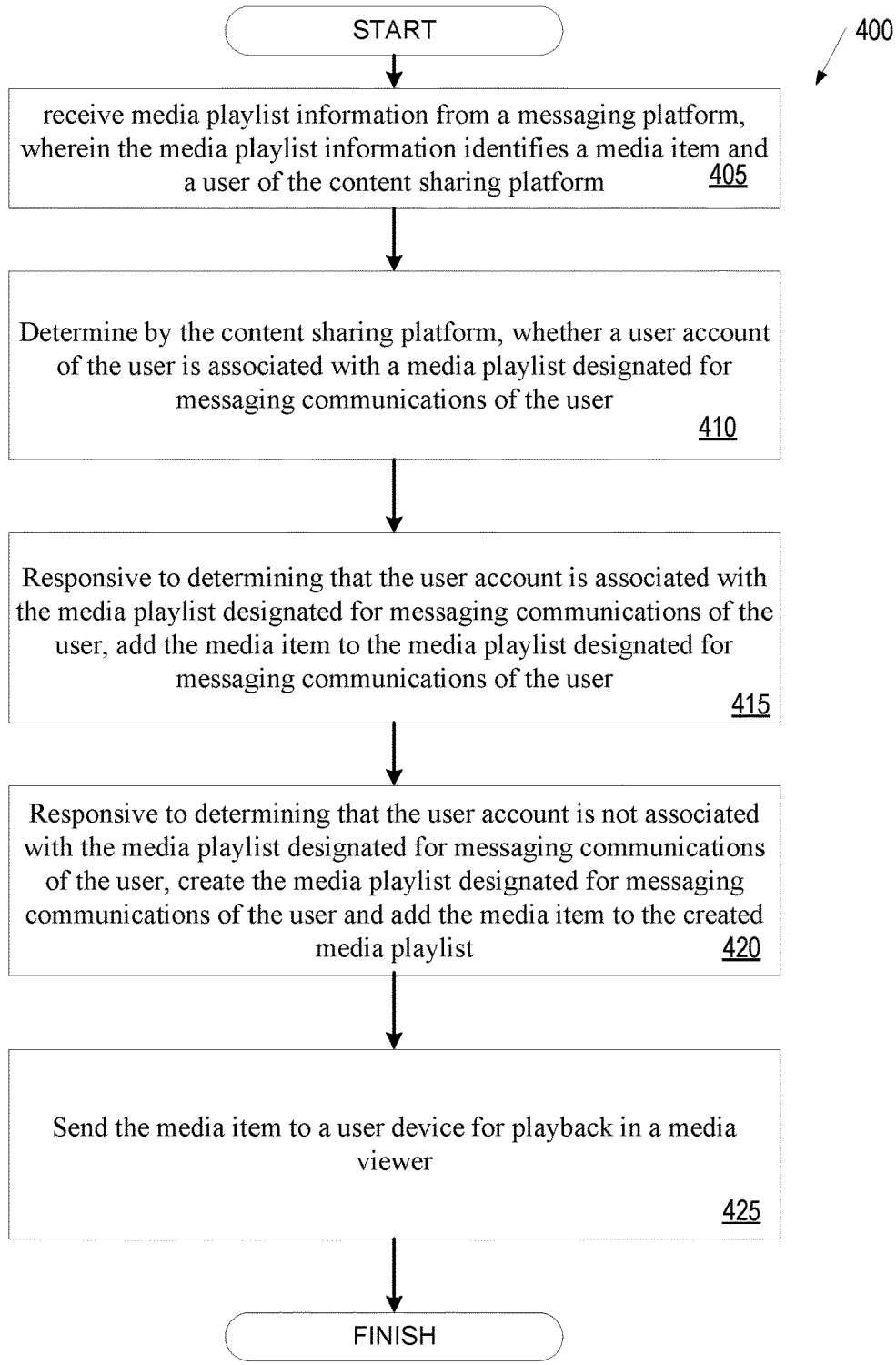
FIG. 4 is a flow diagram illustrating a method for generating media playlist using media playlist information received from a messaging platform, in accordance with some implementations.

FIG. 4 is a flow diagram illustrating a method for generating media playlist using media playlist information received from a messaging platform, in accordance with some implementations. Method 400 may be performed by processing logic that includes hardware (e.g., circuitry, dedicated logic, programmable logic, microcode), software (e.g., instructions run on a processing device to perform hardware simulation), or a combination thereof. In one implementation, electronic message playlist generator module 140 may perform some or all the operations described herein. In some implementations, electronic message playlist generator module 140 or playlist generator submodule 226 of electronic message playlist generator module 140 executing at the content sharing platform 120 may perform some or all the operations.

Method 400 begins at block 405 where processing logic receives, by a content sharing platform, media playlist information from a messaging platform, wherein the media playlist information identifies a media item and a user of the content sharing platform, and indicates that the media item was referenced in a message sent to the user (e.g., via the messaging platform). At block 410, processing logic determines whether a user account of the user is associated with a media playlist designated for messaging communications of the user. At block 415, processing logic, responsive to determining that the user account is associated with the media playlist designated for messaging communications of the user, adds the media item to the media playlist designated for messaging communications of the user. At block 420, processing logic responsive to determining that the user account is not associated with the media playlist designated for messaging communications of the user, creates the media playlist designated for messaging communications of the user and adds the media item to the created media playlist. At block 425, processing logic sends the media item to a user device for playback in a media viewer.

Figure 5:
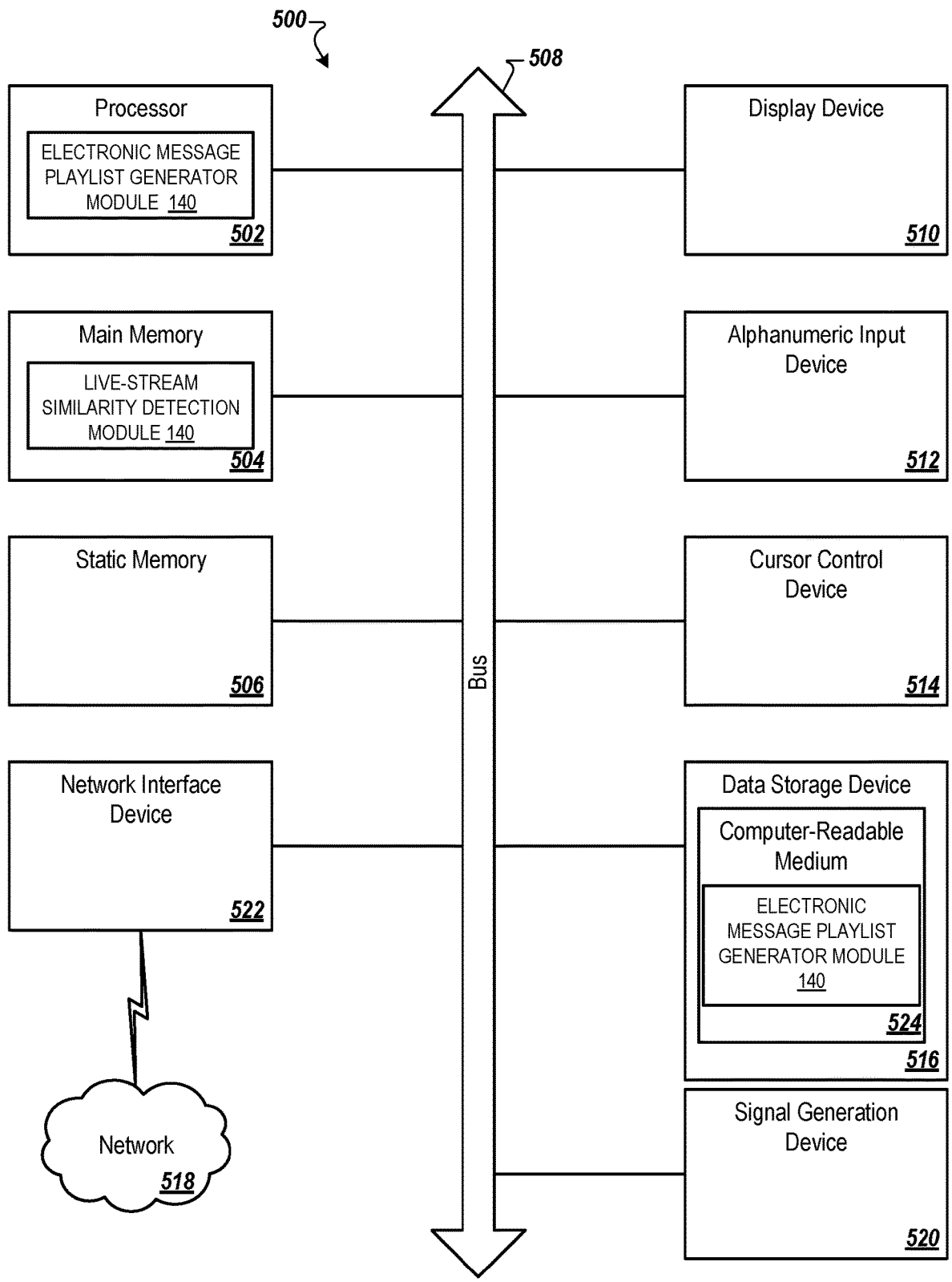
FIG. 5 is a block diagram illustrating an exemplary computer system, according to some implementations.

FIG. 5 is a block diagram illustrating an exemplary computer system 500. The computer system 500 executes one or more sets of instructions that cause the machine to perform any one or more of the methodologies discussed herein. Set of instructions, instructions, and the like may refer to instructions that, when executed computer system 500, cause computer system 500 to perform one or more operations of electronic message playlist generator module 140. The machine may operate in the capacity of a server or a client device in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 516, which communicate with each other via a bus 508.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute instructions of the system architecture 100 and the electronic message playlist generator module 140 for performing the operations and steps discussed herein.

The computer system 500 may further include a network interface device 522 that provides communication with other machines over a network 518, such as a local area network (LAN), an intranet, an extranet, or the Internet. The computer system 500 also may include a display device 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a non-transitory computer-readable storage medium 524 on which is stored the sets of instructions of the system architecture 100 and electronic message playlist generator module 140 embodying any one or more of the methodologies or functions described herein. The sets of instructions of the system architecture 100 and electronic message playlist generator module 140 may also reside, completely or at least partially, within the main memory 504 and/or within the processing device 502 during execution thereof by the computer system 500, the main memory 504 and the processing device 502 also constituting computer-readable storage media. The sets of instructions may further be transmitted or received over the network 518 via the network interface device 522.

While the example of the computer-readable storage medium 524 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "receiving", "adding", "determining", "creating", "sending", "updating", "parsing", "identifying", or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

We claim:

1. A method comprising:
   receiving, by a first user device executing a messaging application, a first message from a second user device;
   determining, by the first user device that is associated with a user, whether the first message includes a first reference to a first media item;
   responsive to determining that the first message includes the first reference to the first media item, generating, by the first user device, media playlist information identifying the first media item; and
   sending, by the first user device, the media playlist information identifying the first media item to a content sharing platform hosting a plurality of media items that comprise the first media item, the first media item to be added to a media playlist that groups different media items for playback and that is maintained by the content sharing platform, wherein the media playlist information comprises information to identify, among a plurality of media playlists maintained by the content sharing platform, the media playlist to which the first media is to be added.

2. The method of claim 1, wherein the first media item is a video item.

3. The method of claim 1, wherein the first media item identified in the media playlist information sent to the content sharing platform is to be recommended to the user associated with the first user device by the content sharing platform.

4. The method of claim 1, further comprising:
   receiving, from a third user device executing a third instance of the messaging application, a second message;
   determining whether the second message includes a second reference to a second media item; and
   responsive to determining that the second message includes the second reference to the second media item, updating the media playlist information to identify the second media item.

5. The method of claim 1, wherein determining whether the first message includes the first reference to the first media item comprises:
   parsing the first message to identify a link;
   identifying a uniform resource locator (URL) associated with the link; and
   determining that the URL is associated with the content sharing platform hosting the first media item.

6. The method of claim 1, wherein generating the media playlist information identifying the first media item comprises:
   determining whether the user has not interacted with the first reference to the first media item within a threshold amount of time; and
   responsive to determining that the first message includes the first reference to the first media item and the user has not interacted with the first reference to the first media item within the threshold amount of time, generating the media playlist information identifying the first media item.

7. The method of claim 1, wherein generating the media playlist information identifying the first media item comprises:
responsive to determining that the first message includes the first reference to the first media item, identifying a user preference indicating conditions for generating the media playlist information;
determining whether the conditions indicated by the user preference have been satisfied; and
responsive to determining the conditions indicated by the user preference have been satisfied, generating the media playlist information identifying the first media item.

8. The method of claim 1, wherein generating the media playlist information identifying the first media item comprises:
analyzing a conversation comprising the first message using a machine-learning language classifier;
determining a sentiment of the conversation based on the machine-learning language classifier;
responsive to determining the conversation is associated with a positive user sentiment, generating the media playlist information identifying the positive user sentiment; and
responsive to determining the conversation is associated with a negative user sentiment, refraining from generating the media playlist information for the first media item.

9. The method of claim 1, wherein generating the media playlist information identifying the first media item comprises:
analyzing a conversation comprising the first message using a machine-learning language classifier;
determining a topic of the conversation based on the machine-learning language classifier; and
generating the media playlist information identifying the topic of the conversation.

10. The method of claim 1, wherein generating the media playlist information identifying the first media item comprises:
determining a sending user associated with a conversation comprising the first message; and
generating the media playlist information identifying the sending user.

11. An apparatus comprising:
a memory device; and
a processing device, coupled to the memory device, to:
receive, by a first user device executing a messaging application using the processing device, a first message from a second user device;
determine, by the first user device associated with a user, whether the first message includes a first reference to a first media item;
responsive to determining that the first message includes the first reference to the first media item, generate, by the first user device, media playlist information identifying the first media item; and
send, by the first user device, the media playlist information identifying the first media item to a content sharing platform hosting a plurality of media items that comprise the first media item, the first media item to be added to a media playlist that groups different media items for playback and that is maintained by the content sharing platform, wherein the media playlist information comprises information to identify, among a plurality of media playlists maintained by the content sharing platform, the media playlist to which the first media is to be added.

12. The apparatus of claim 11, wherein sending the first media item identified in the media playlist information sent to the content sharing platform is to be recommended to the user associated with the first user device by the content sharing platform.

13. The apparatus of claim 11, wherein to generate the media playlist information identifying the first media item, the processing device further to:
determine whether the user has not interacted with the first reference to the first media item within a threshold amount of time; and
responsive to determining that the first message includes the first reference to the first media item and the user has not interacted with the first reference to the first media item within the threshold amount of time, generate the media playlist information identifying the first media item.

14. The apparatus of claim 11, wherein to generate the media playlist information identifying the first media item, the processing device further to:
responsive to determining that the first message includes the first reference to the first media item, identify a user preference indicating conditions for generating the media playlist information;
determine whether the conditions indicated by the user preference have been satisfied; and
responsive to determining the conditions indicated by the user preference have been satisfied, generate the media playlist information identifying the first media item.

15. The apparatus of claim 11, wherein to generate the media playlist information identifying the first media item, the processing device further to:
analyze a conversation comprising the first message using a machine-learning language classifier;
determine a sentiment of the conversation based on the machine-learning language classifier;
responsive to determining the conversation is associated with a positive user sentiment, generate the media playlist information identifying the positive user sentiment; and
responsive to determining the conversation is associated with a negative user sentiment, refrain from generating the media playlist information for the first media item.

16. The apparatus of claim 11, wherein to generate the media playlist information identifying the first media item, the processing device further to:
analyze a conversation comprising the first message using a machine-learning language classifier;
determine a topic of the conversation based on the machine-learning language classifier; and
generate the media playlist information identifying the topic of the conversation.

17. A non-transitory computer-readable medium comprising instructions that, responsive to execution by a processing device, cause the processing device to perform operations comprising:
receiving, by a first user device executing a messaging application using the processing device, a first message from a second user device;
determining, by the first user device that is associated with a user, whether the first message includes a first reference to a first media item;

responsive to determining that the first message includes the first reference to the first media item, generating, by the first user device, media playlist information identifying the first media item; and sending, by the first user device, the media playlist information identifying the first media item to a content sharing platform hosting a plurality of media items that comprise the first media item, the first media item to be added to a media playlist that groups different media items for playback and that is maintained by the content sharing platform, wherein the media playlist information comprises information to identify, among a plurality of media playlists maintained by the content sharing platform, the media playlist to which the first media is to be added.

18. The non-transitory computer-readable medium of claim 17, wherein sending the first media item identified in the media playlist information sent to the content sharing platform is to be recommended to the user associated with the first user device by the content sharing platform.

19. The non-transitory computer-readable medium of claim 17, wherein determining whether the first message includes the first reference to the first media item comprises:

parsing the first message to identify a link;

identifying a uniform resource locator (URL) associated with the link; and determining that the URL is associated with the content sharing platform hosting the first media item.

20. The non-transitory computer-readable medium of claim 17, wherein generating the media playlist information identifying the first media item comprises:

determining whether the user has not interacted with the first reference to the first media item within a threshold amount of time; and responsive to determining that the first message includes the first reference to the first media item and the user has not interacted with the first reference to the first media item within the threshold amount of time, generating the media playlist information identifying the first media item.

* * * * *